(12) United States Patent
Nakamura et al.

(10) Patent No.: US 12,719,995 B2
(45) Date of Patent: Aug. 25, 2026

(54) IMAGE READING DEVICE AND IMAGE READING METHOD

(71) Applicants: Shogo Nakamura, Kanagawa (JP); Ayumu Hashimoto, Kanagawa (JP)

(72) Inventors: Shogo Nakamura, Kanagawa (JP); Ayumu Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 241 days.

(21) Appl. No.: 18/669,555

(22) Filed: May 21, 2024

(65) Prior Publication Data

US 2024/0406325 A1 Dec. 5, 2024

(30) Foreign Application Priority Data

Jun. 5, 2023 (JP) ................................ 2023-092692

(51) Int. Cl.
*G06F 15/00* (2006.01)
*H04N 1/00* (2006.01)
*H04N 1/387* (2006.01)

(52) U.S. Cl.
CPC ..... *H04N 1/00753* (2013.01); *H04N 1/00718* (2013.01); *H04N 1/00729* (2013.01); *H04N 1/00734* (2013.01); *H04N 1/00748* (2013.01); *H04N 1/0075* (2013.01); *H04N 1/3877* (2013.01)

(58) Field of Classification Search
None
See application file for complete search history.

(56) References Cited

U.S. PATENT DOCUMENTS 11,838,467 B2 * 12/2023 Nambara ........... H04N 1/00779
2016/0221778 A1 * 8/2016 Ueda ........................ B65H 7/20
2017/0244853 A1 8/2017 Yabuuchi et al.
2017/0264782 A1 9/2017 Hashimoto
(Continued)

FOREIGN PATENT DOCUMENTS

EP 3 876 509 A1 9/2021
JP 2014-053739 A 3/2014
(Continued)

OTHER PUBLICATIONS

Extended European Search Report issued Oct. 30, 2024 in European Patent Application No. 24178421.4, 13 pages.

*Primary Examiner* — Mark R Milia
(74) *Attorney, Agent, or Firm* — XSENSUS LLP

(57) ABSTRACT

An image reading device includes an illuminator, an imager, a background portion, and an image processor. The illuminator irradiates a subject with visible light and invisible light. The imager receives the visible light and the invisible light reflected by the subject to capture a visible image and an invisible image. The background portion is disposed in an image capturing range of the imager. The background portion has a reflectance at a specific wavelength of the visible light equal to or higher than a lower limit of visible light reflectance, and a reflectance at a specific wavelength of the invisible light equal to or lower than an upper limit of invisible light reflectance. The image processor detects a feature of one of the subject and the background portion from at least one of the visible image and the invisible image.

20 Claims, 12 Drawing Sheets

(56) References Cited

U.S. PATENT DOCUMENTS

| | | | |
|---|---|---|---|
| 2020/0053229 | A1 | 2/2020 | Hashimoto et al. |
| 2020/0053230 | A1 | 2/2020 | Nakazawa et al. |
| 2020/0053233 | A1* | 2/2020 | Nakazawa ......... H04N 1/00241 |
| 2020/0244837 | A1 | 7/2020 | Tsukahara et al. |
| 2020/0252513 | A1 | 8/2020 | Nakada et al. |
| 2020/0336615 | A1 | 10/2020 | Ono et al. |
| 2020/0412904 | A1* | 12/2020 | Ohmiya ............... G06V 10/145 |
| 2021/0021729 | A1 | 1/2021 | Hashimoto et al. |
| 2021/0281712 | A1 | 9/2021 | Nakamura et al. |
| 2021/0409566 | A1 | 12/2021 | Hashimoto |
| 2022/0109769 | A1 | 4/2022 | Ishikura et al. |

FOREIGN PATENT DOCUMENTS

| | | | |
|---|---|---|---|
| JP | 2021-141467 | A | 9/2021 |
| JP | 2022-059526 | A | 4/2022 |
| JP | 2022-129239 | A | 9/2022 |

* cited by examiner 1
10
11
12
13
14
14-1
15
15-1
15-2
16
17
18
19
20
21
22
23
24
25
26
40
100

FIG. 4
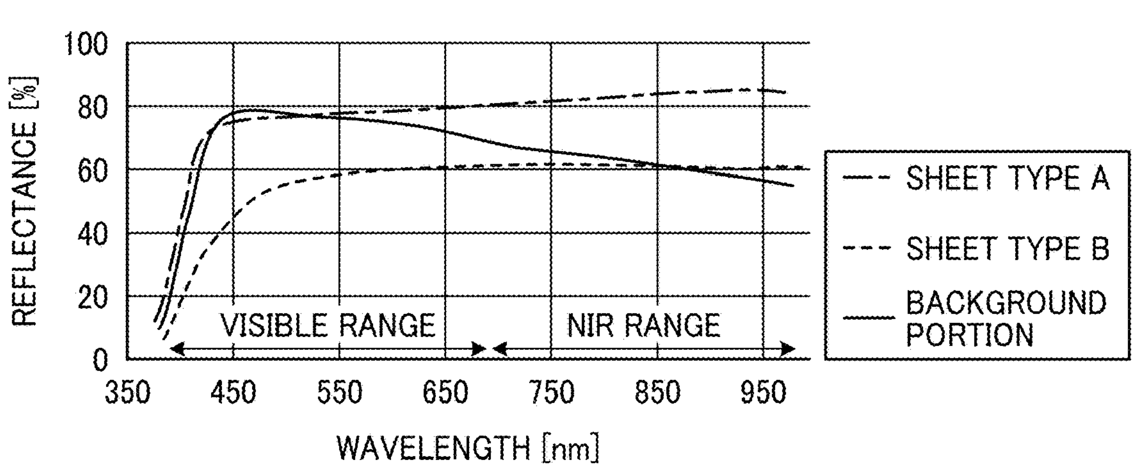
FIG. 5A
FIG. 5B
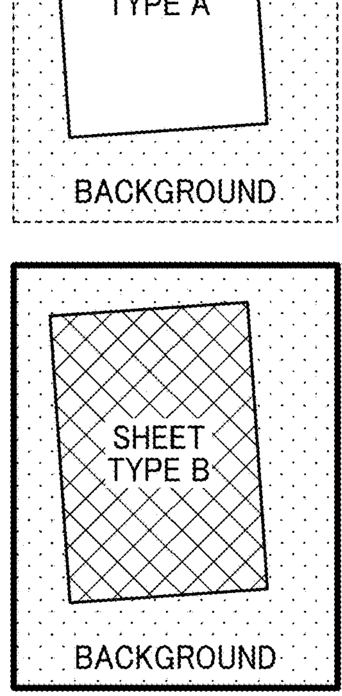
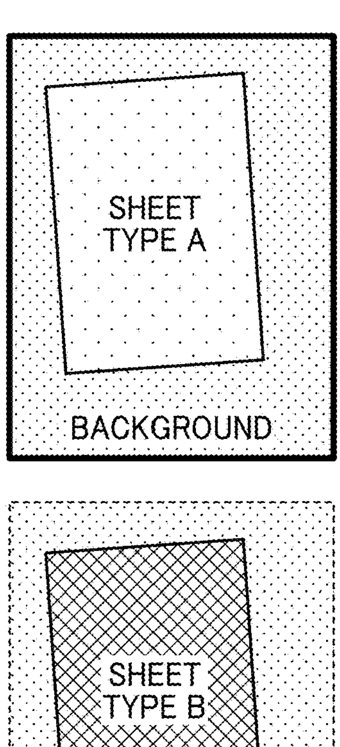

43
IMAGE PROCESSOR
431
FEATURE DETECTING UNIT

REFLECTANCE [%]
LOWER LIMIT OF VISIBLE LIGHT REFLECTANCE
UPPER LIMIT OF INVISIBLE LIGHT REFLECTANCE
SPECIFIC WAVELENGTH OF VISIBLE LIGHT
SPECIFIC WAVELENGTH OF INVISIBLE LIGHT
WAVELENGTH [nm]

FIG. 8A
FIG. 8B
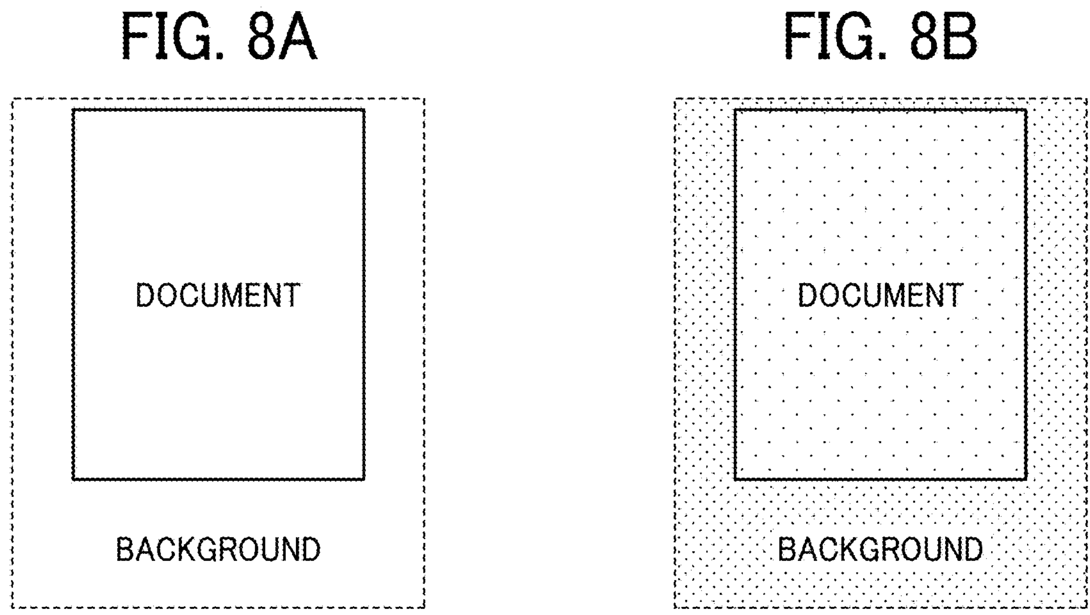
FIG. 9
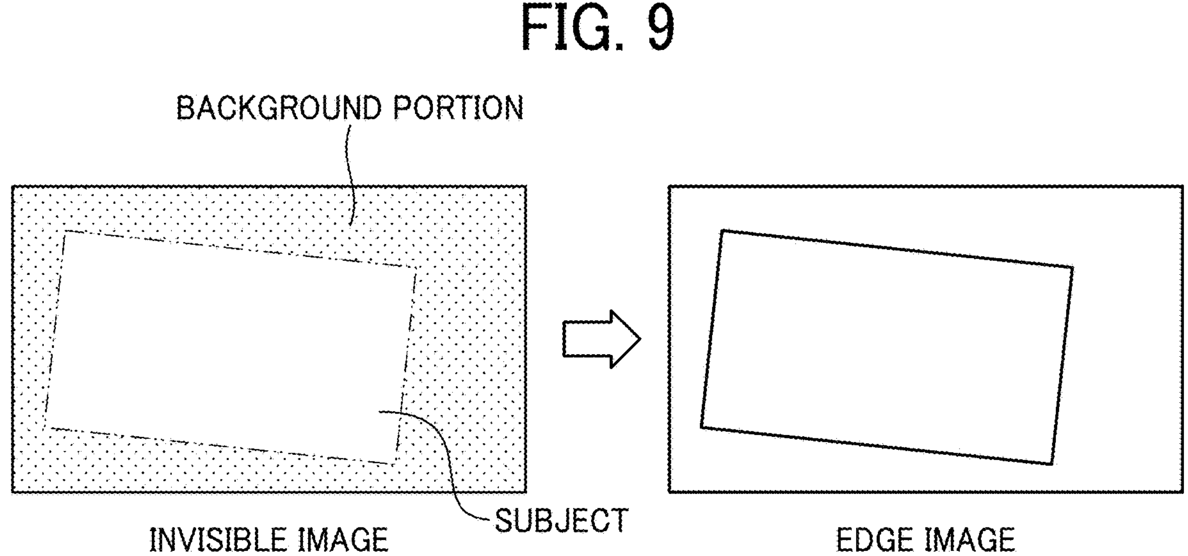

ACTUAL READ VALUE OF REFERENCE WHITE BOARD
PREDICTED READ VALUE OF REFERENCE WHITE BOARD
READ VALUE OF BACKGROUND PORTION

READ VALUE [digit]

TIME [s]

DOCUMENT

FIG. 18
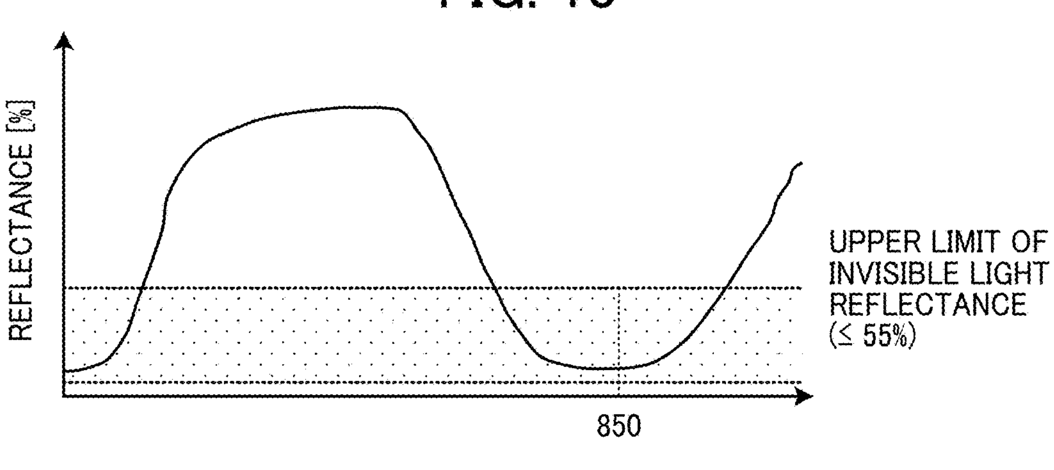
FIG. 19
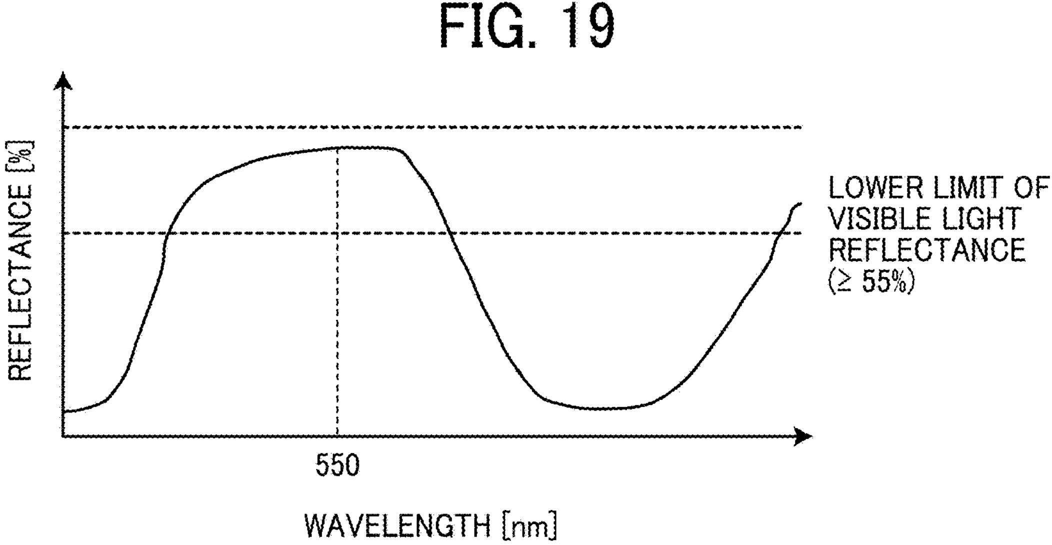
FIG. 20
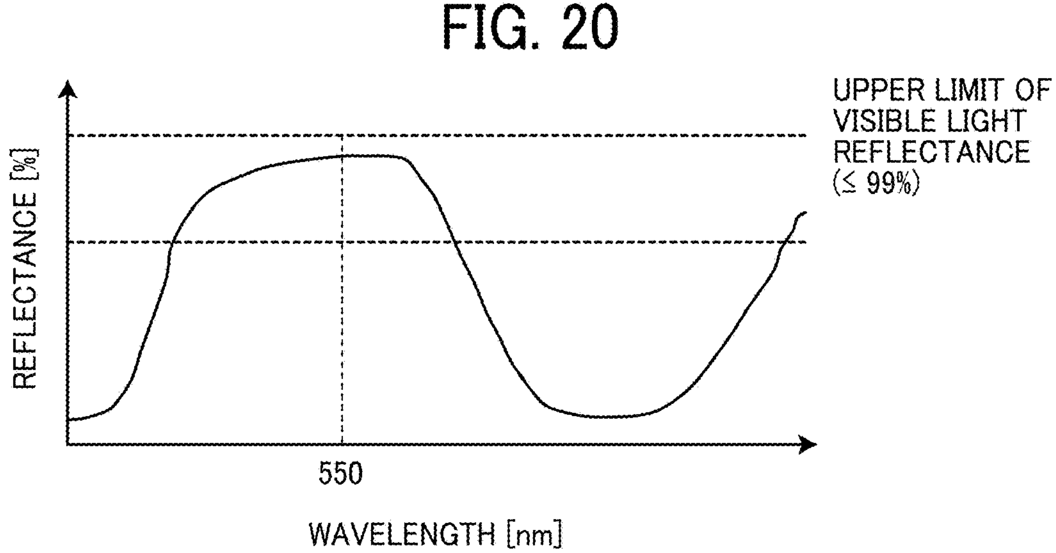

IMAGE READING DEVICE AND IMAGE READING METHOD

CROSS-REFERENCE TO RELATED APPLICATION

This patent application is based on and claims priority pursuant to 35 U.S.C. § 119(a) to Japanese Patent Application No. 2023-092692, filed on Jun. 5, 2023, in the Japan Patent Office, the entire disclosure of which is hereby incorporated by reference herein.

BACKGROUND

Technical Field

Embodiments of the present disclosure relate to an image reading device and an image reading method.

Related Art

An image processing technique that has been known in the related art for image reading devices is, for example, a technique of correcting, based on an edge between a document and a background detected from a read image, the inclination and position of the document and cutting out the document from the read image according to the document size based on the edge.

Some image reading devices in the related art may include a background portion that includes an invisible-light low reflecting portion, which is low in reflection of invisible light, for the image processing described above, to enable the detection of an edge between the document and the background.

However, when the invisible light reflectance of the invisible-light low reflecting portion is reduced, the visible light reflectance is also reduced in general. When the visible light reflectance is thus reduced, the background of the document is darkened. The darkened background affects an image processing function such as white sheet detection or makes an image unnatural when the background remains in the image.

SUMMARY

According to an embodiment of the present disclosure, an image reading device includes an illuminator, an imager, a background portion, and an image processor. The illuminator irradiates a subject with visible light and invisible light. The imager receives the visible light and the invisible light reflected by the subject to capture a visible image and an invisible image. The background portion is disposed in an image capturing range of the imager. The background portion has a reflectance at a specific wavelength of the visible light equal to or higher than a lower limit of visible light reflectance, the lower limit of visible light reflectance specifying a lower limit of reflectance of the visible light, and a reflectance at a specific wavelength of the invisible light equal to or lower than an upper limit of invisible light reflectance, the upper limit of invisible light reflectance specifying an upper limit of reflectance of the invisible light. The image processor detects a feature of one of the subject and the background portion from at least one of the visible image and the invisible image.

According to an embodiment of the present disclosure, an image reading method executed by an image reading device includes irradiating, receiving, and detecting. The irradiating is irradiating, with an illuminator, a subject with visible light and invisible light. The receiving is receiving, with an imager, the visible light and the invisible light reflected by the subject to capture a visible image and an invisible image. The detecting is detecting, with an image processor, a feature of one of the subject and a background portion disposed in an image capturing range of the imager from at least one of the visible image and the invisible image. The background portion has a reflectance at a specific wavelength of the visible light equal to or higher than a lower limit of visible light reflectance, the lower limit of visible light reflectance specifying a lower limit of reflectance of the visible light, and a reflectance at a specific wavelength of the invisible light equal to or lower than an upper limit of invisible light reflectance, the upper limit of invisible light reflectance specifying an upper limit of reflectance of the invisible light.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a graph illustrating an example of the difference in spectral reflection characteristics depending on media in an imager;

FIGS. 5A and 5B are diagrams illustrating an example of the difference between a visible image and an invisible image;

FIGS. 8A and 8B are diagrams illustrating an example of the difference between read images due to the difference in the reflectance of a background portion;

FIG. 9 is a diagram illustrating an example of edge detection of a subject;

FIG. 18 is a graph illustrating a reflectance specification of a background portion according to a fifth embodiment of the present disclosure;

FIG. 19 is a graph illustrating a reflectance specification of a background portion according to a sixth embodiment of the present disclosure;

FIG. 20 is a graph illustrating a reflectance specification of a background portion according to a seventh embodiment of the present disclosure;

Figure 1:
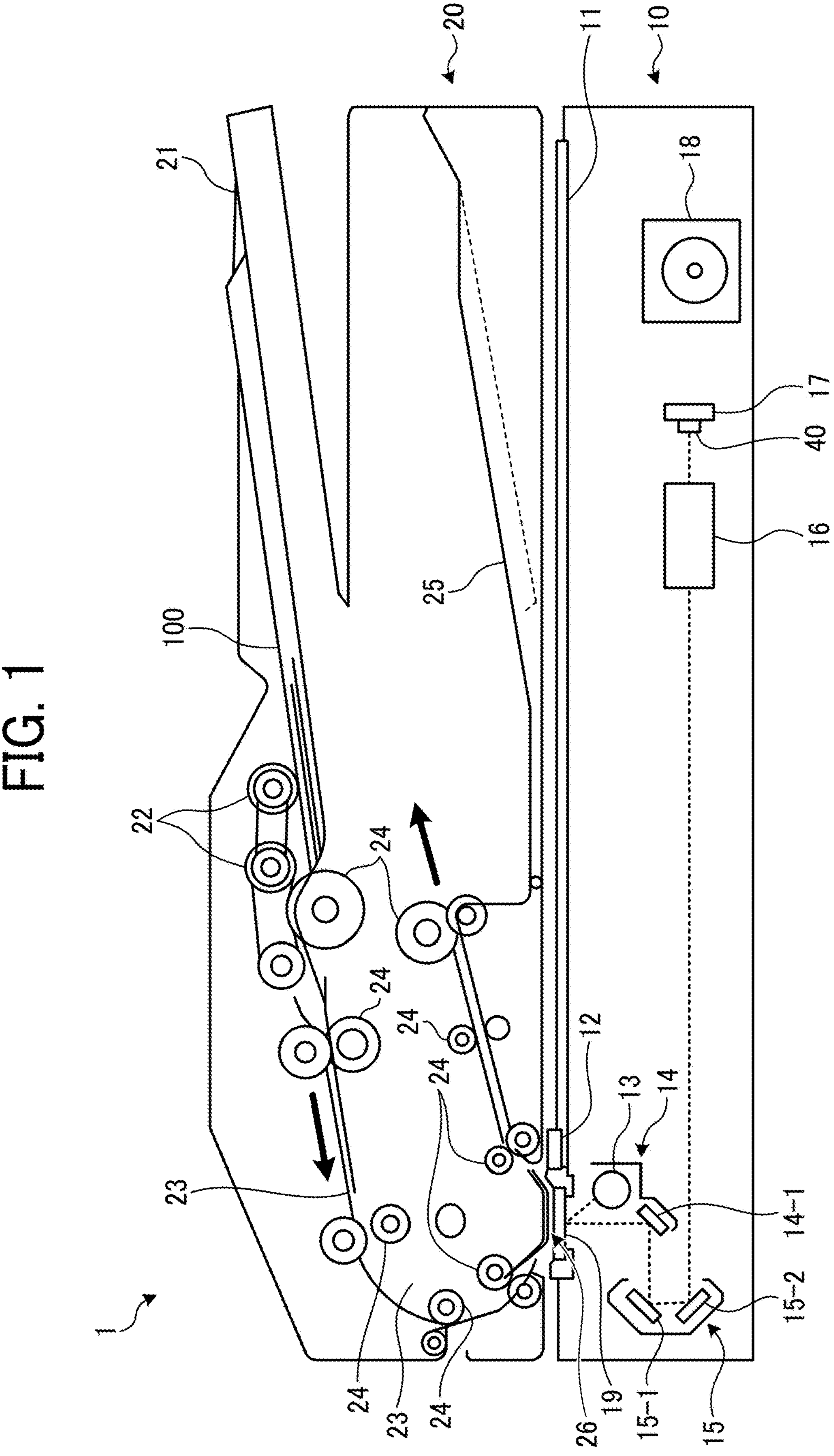
FIG. 1 is a diagram illustrating a configuration of an image reading device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference signs denote like elements such as parts and materials having the same functions, and redundant descriptions thereof are omitted unless otherwise required.

As used herein, the term "connected/coupled" includes both direct connections and connections in which there are one or more intermediate connecting elements.

In the following description, for example, the term "visible" refers to a wavelength range of visible light (visible wavelength range) whereas the term "invisible" refers to a wavelength range of infrared rays or ultraviolet rays other than visible light.

First Embodiment

FIG. 1 is a diagram illustrating a configuration of an image reading device 1 according to a first embodiment of the present disclosure.

FIG. 1 illustrates the configuration of the image reading device 1 included in an image forming apparatus that is typically called a multifunction peripheral, printer, or product (MFP) having at least two of copying, printing, scanning, and facsimile functions. Although FIG. 1 illustrates the configuration of the image reading device 1 that includes a reading unit, the image reading device may be provided separately from the reading unit (reading device).

The image reading device 1 includes a reading device body 10 having an upper face provided with a platen 11. The image reading device 1 further includes, for example, a light source 13, a first carriage 14, a second carriage 15, a lens unit 16, and a sensor board 17 inside the reading device body 10. In FIG. 1, the first carriage 14 includes the light source 13 and a reflection mirror 14-1 whereas the second carriage 15 includes reflection mirrors 15-1 and 15-2.

The light source 13 emits light to an object to be read. The reflected light from the object is reflected by the reflection mirror 14-1 of the first carriage 14 and the reflection mirrors 15-1 and 15-2 of the second carriage 15. Then, the reflected light is incident on the lens unit 16, which forms an image of the object on the light-receiving face of the sensor board 17. The sensor board 17 includes an imager 40, which is a line sensor such as a charge-coupled device (CCD) or a complementary metal oxide semiconductor (CMOS). The imager 40 sequentially converts the images of the object formed on the light-receiving face into electrical signals. A reference white board 12 is a white density reference member that is read for correction of, for example, a change in the amount of light of the light source 13 or variations in pixels (pixel circuits) of the imager 40.

The image reading device 1 includes a control board in the reading device body 10 to control the components in the reading device body 10 and the components of an automatic document feeder (ADF) 20 to read an object to be read by a predetermined reading method. The object to be read is, for example, a recording medium on which characters or patterns are formed. In the following description, the recording medium is referred to as a document. The document is an example of a "subject." Although the document is described as paper or a transparent sheet such as an overhead projector (OHP) transparency as an example, the document is not limited thereto.

The image reading device 1 includes the ADF 20 above the reading device body 10. The image reading device 1 reads a document 100 with the ADF 20 by a sheet-through method. The ADF 20 is an example of a "feeder." In the configuration of the image reading device 1 illustrated in FIG. 1, the reading device 1 separates, with pickup rollers 22, documents 100 one by one from a stack of documents 100 on a tray 21 of the ADF 20, conveys the document 100 to a conveyance passage 23, reads the side to be read of the document 100 at a predetermined reading position in the reading unit, and ejects the document 100 onto an output tray 25. The document 100 is conveyed by rotation of conveyance rollers 24.

For example, the image reading device 1 causes the document 100 to pass between a reading window 19 and a background portion 26 of the reading unit with the first carriage 14 and the second carriage 15 moved to and fixed at predetermined home positions. The reading window 19 is a slit-shaped reading window formed as a part of the platen 11. The background portion 26 is a member facing the reading window 19. While the document 100 passes through the reading window 19, the reading unit irradiates a first side (front side or back side) of the document 100 facing the reading window 19 with light from the light source 13 and receives reflected light with the imager 40 on the sensor board 17 to read an image.

The reading unit as a first reading unit includes, for example, the light source 13, the background portion 26, an optical system that guides the reflected light from the document 100 to the imager 40 on the sensor board 17, and the imager 40. The optical system includes, for example, the reflection mirror 14-1, the reflection mirrors 15-1 and 15-2, and the lens unit 16. A detailed description of the configuration of the reading unit will be described later with reference to FIG. 3.

The image reading device 1 may include, for example, a reversing assembly to reverse the front and back sides of the document 100 to read both sides of the document 100. The image reading device 1 reverses the document 100 with the reversing assembly and reads a second side of the document 100 at the reading position (reading window 19) of the reading unit. Instead of the reversing assembly, the image reading device 1 may include another configuration such as a second reading unit to read the second side of the document 100. For example, after the document 100 passes the reading window 19, the image reading device 1 reads the second side of the document 100 with the second image reading unit including a reading sensor that is disposed to read the back side of the document 100. In this case, a member facing the reading sensor is an example of the background portion 26 (see FIG. 2).

The configuration of the image reading device 1 according to the present example allows the image reading device 1 to read the document 100 by flatbed scanning. Specifically, the ADF 20 is lifted to expose the platen 11, on which the document 100 is directly placed. Then, the ADF 20 is lowered to the original position to press the back side of the document 100 with the lower portion of the ADF 20. As the document 100 is fixed in the flatbed scanning, the first carriage 14 and the second carriage 15 are moved relative to the document 100 to scan the document 100. The first carriage 14 and the second carriage 15 are driven by a scanner motor 18 to scan the document 100 in the sub-scanning direction. For example, the first carriage 14 moves at a speed V, and at the same time, the second carriage 15 moves at a speed ½ V, which is half the speed of the first carriage 14, in conjunction with the movement of the first carriage 14. Thus, the image reading device 1 reads the first side of the document 100 facing the platen 11. In this case, the lower portion of the ADF 20 is a member that presses the back side of the document 100 and is an example of the background portion 26 (see FIG. 2).

Although FIG. 1 illustrates, for example, the first carriage 14, the second carriage 15, the lens unit 16, and the sensor board 17 as separate components, these components may be provided individually or as an integrated sensor module.

Figure 2:
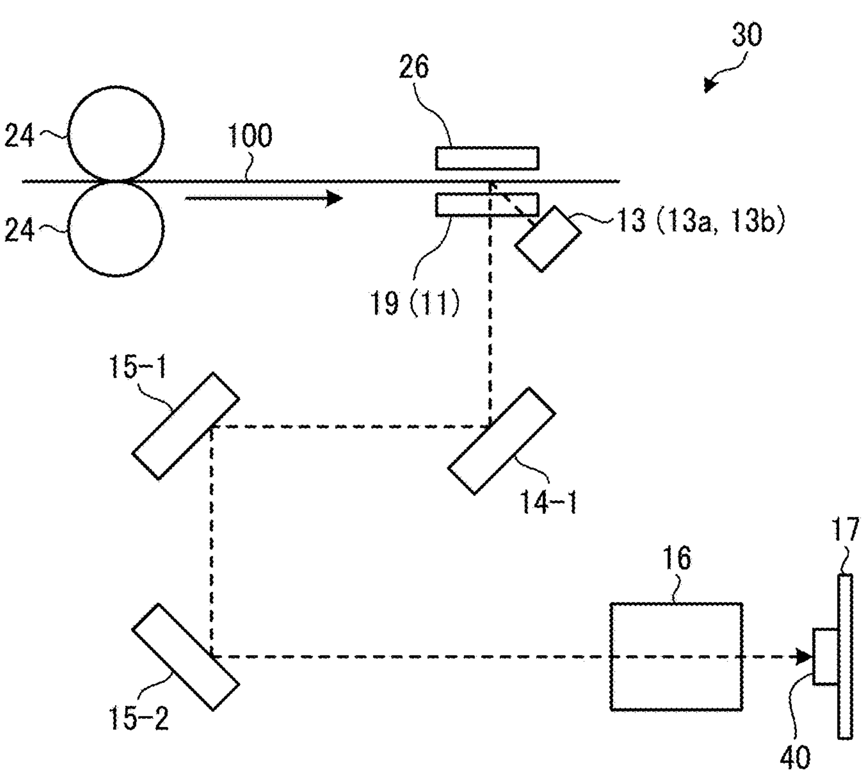
FIG. 2 is a diagram illustrating an example of a configuration of a reading unit.

FIG. 2 is a diagram illustrating an example of a configuration of a reading unit 30.

FIG. 2 illustrates, as an example, the configuration of the reading unit 30 (first reading unit) that reads the first side of the document 100 and a conveyance mechanism. As illustrated in FIG. 2, the document 100 sent by the conveyance rollers 24 passes between the reading position (reading window 19) of the platen 11 and the background portion 26.

The reading unit 30 includes the background portion 26 as a set. While the document 100 passes the reading window 19, the reading unit 30 irradiates the first side of the document 100 facing the reading window 19 with light from the light source 13 and receives reflected light from the first side of the document 100 through the path illustrated by the broken line in FIG. 2 with the imager 40 on the sensor board 17 to read an image.

The configuration of the reading unit is not limited to the configuration of the first reading unit. The configuration may be modified as appropriate for, for example, a method of reading with a contact image sensor employed by the second reading unit or the configuration of the image reading device.

As illustrated in FIG. 2, the light source 13 according to the present embodiment includes a visible light source 13*a* and an invisible light source 13*b*. The light source 13 is an illuminator that irradiates a subject with visible light and invisible light. The visible light source 13*a* irradiates the subject and the background portion 26 with visible light. The invisible light source 13*b* irradiates the subject and the background portion 26 with invisible light. Effectively, the invisible light source 13*b* emits infrared light. In general, the visible light wavelength range is from 380 nm to 750 nm, and the range from 750 nm onward is the infrared wavelength range, which is the range of invisible light.

Figure 3:
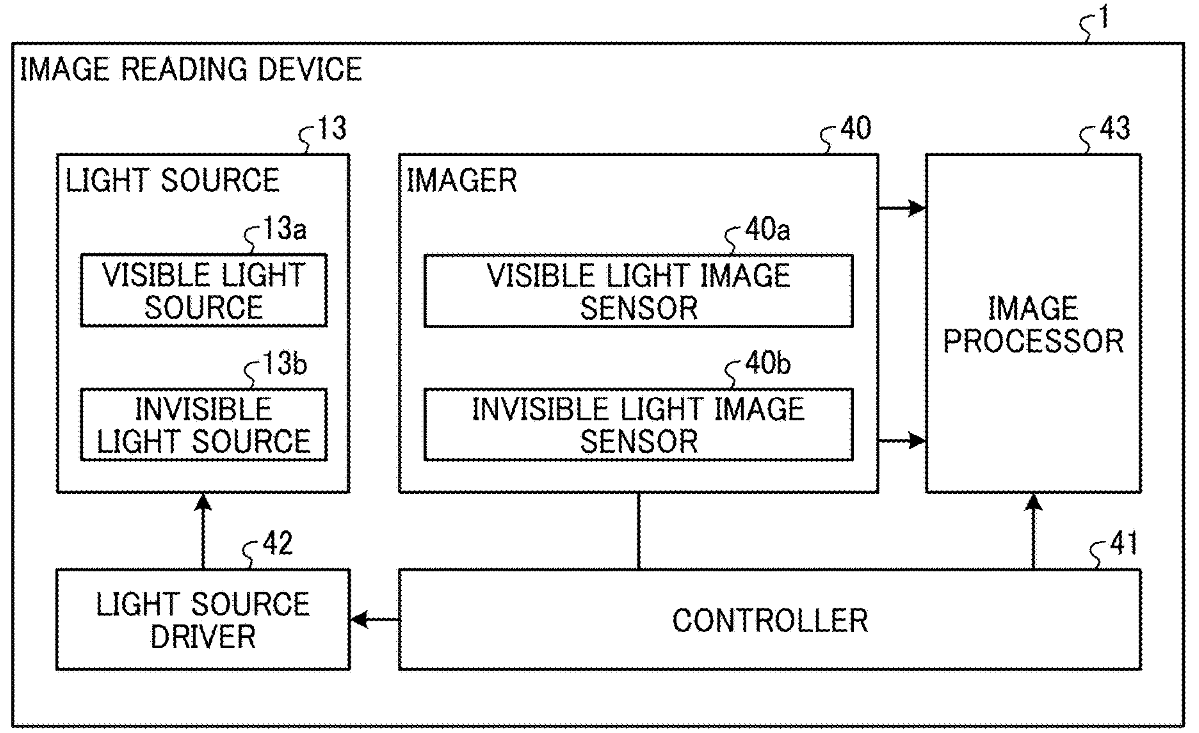
FIG. 3 is a block diagram illustrating the electric connections of components of the image reading device of FIG. 1.

FIG. 3 is a block diagram illustrating the electric connections of components of the image reading device 1.

As illustrated in FIG. 3, the image reading device 1 includes a controller 41, a light source driver 42, and an image processor 43, in addition to the imager 40 and the light source 13 described above. The controller 41 controls the imager 40, the light source driver 42, and the image processor 43. The light source driver 42 drives the light source 13 under the control of the controller 41. The imager 40 transfers signals to the image processor 43 that is disposed to follow the imager 40.

The imager 40 includes an invisible light image sensor 40*b* that functions as an invisible image reading unit and a visible light image sensor 40*a* that functions as a visible image reading unit. The imager 40 receives the visible light and the invisible light reflected by the subject and captures a visible image and an invisible image. More specifically, the invisible light image sensor 40*b* reads reflected invisible light from the subject as part of the invisible light to acquire an invisible image (an image in the invisible light wavelength range). The visible light image sensor 40*a* reads reflected visible light from the subject as part of the visible light to acquire a visible image (an image in the visible light wavelength range). The invisible light image sensor 40*b* and the visible light image sensor 40*a* are sensors for a reduction optical system and are, for example, complementary metal oxide semiconductor (CMOS) image sensors.

The visible light image sensor 40*a* and the invisible light image sensor 40*b* may be integrally configured. Since the visible light and the infrared light are read at positions closer to each other in such a compact configuration, lost information can be extracted and restored with high accuracy. In other words, a plurality of times of reading does not cause image deviation and the correction can be performed with high positional accuracy.

The image processor 43 executes various kinds of image processing according to the application of image data. The image processor 43 may be implemented in either hardware or software.

In one example, the image processor 43 is implemented by an image processing circuit such as an application specific integrated circuit (ASIC).

In another example, the image processor 43 is implemented by a central processing unit (CPU) that performs image processing according to a control program stored in any desired memory.

Figures 6, 7:
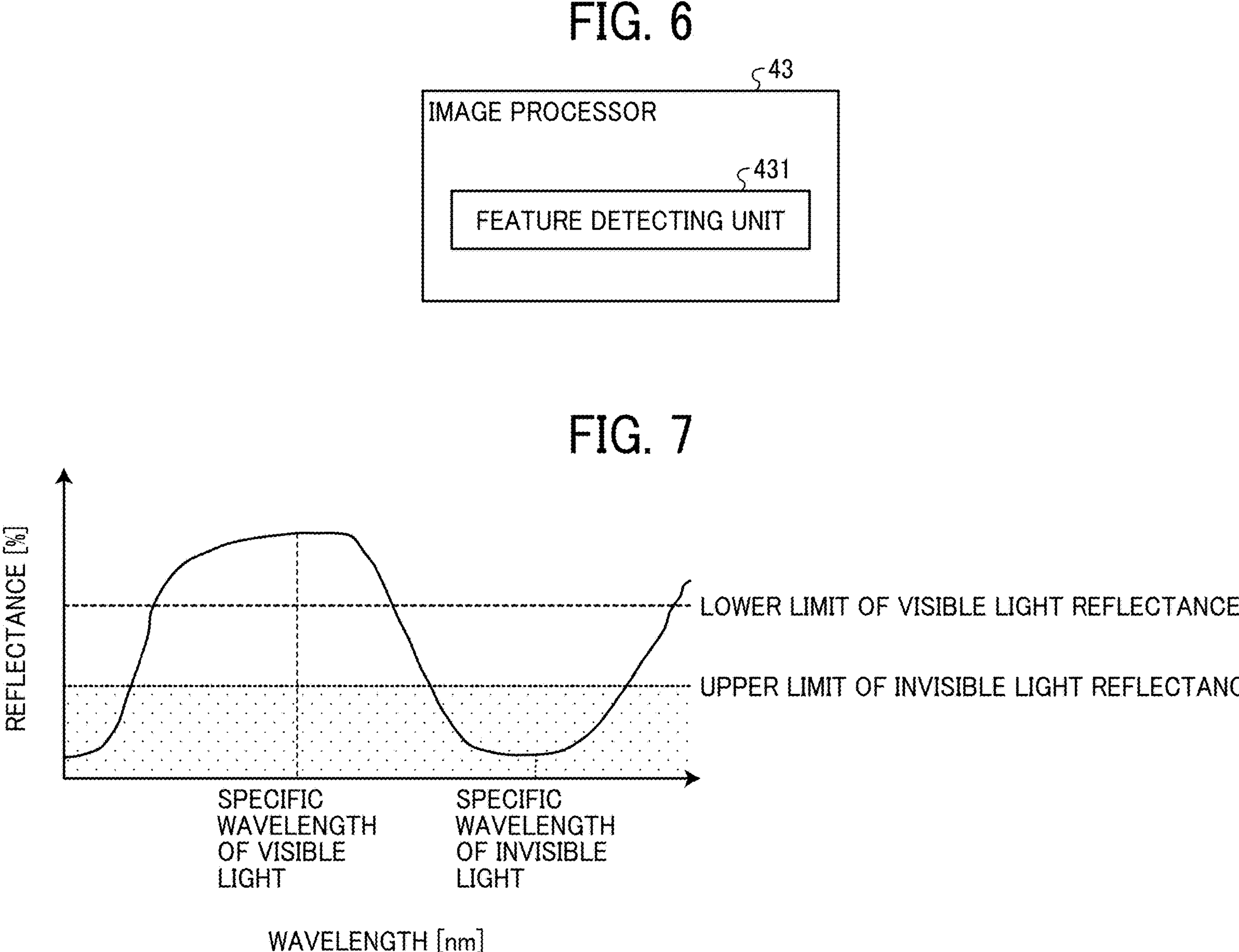
FIG. 6 is a block diagram illustrating a functional configuration of an image processor included in the image reading device of FIG. 1.
FIG. 7 is a graph illustrating a reflectance specification of a background portion according to the first embodiment.

FIG. 6 is a block diagram illustrating a functional configuration of the image processor 43 according to the present embodiment.

As illustrated in FIG. 6, the image processor 43 includes a feature detecting unit 431. The image processor 43 detects, with the feature detecting unit 431, the feature of one of the subject and the background portion 26 from at least one of the visible image and the invisible image obtained in the reading device body 10. The feature is, for example, an edge between the background portion 26 and the document 100.

A description is given below of the difference in spectral reflection characteristics depending on media in the imager 40.

FIG. 4 is a graph illustrating an example of the difference in spectral reflection characteristics depending on media.

FIG. 4 is a graph illustrating the spectral reflection characteristics of two types of plain paper sheets: sheet type A and sheet type B, which are typically used as documents to be read by the image reading device 1, and the background portion 26. In FIG. 4, the alternate long and short dash line indicates the spectral reflection characteristic of the plain paper sheet of sheet type A, the dotted line indicates the spectral reflection characteristic of the plain paper sheet of sheet type B, and the solid line indicates the spectral reflection characteristic of the background portion 26.

As can be seen from FIG. 4, the background portion 26, which is a white background, has a relatively large difference in reflectance from the sheet type B in the visible wavelength range whereas the background portion 26 has a relatively large difference in reflectance from the sheet type A in the near-infrared (NIR) wavelength range.

FIGS. 5A and 5B are diagrams illustrating an example of the difference between the visible image and the invisible image. Specifically, FIG. 5A illustrates visible images whereas FIG. 5B illustrates invisible images.

As illustrated in FIGS. 5A and 5B, the images obtained under visible light and the images obtained under invisible light have features different from each other. For this reason, the target feature can be easily obtained when the image to be detected is set in advance as either the visible image or the invisible image, based on the type of the subject or the type of the background portion 26.

For example, in the example illustrated in FIGS. 5A and 5B, the feature is detected from the invisible image of sheet type A because the invisible image of sheet type A has a larger difference in spectral reflection characteristics from the background portion 26 than the visible image of sheet type A. By contrast, the feature is detected from the visible image of sheet type B.

A description is given below of a reflectance specification of the background portion 26 as a feature of the present embodiment.

FIG. 7 is a graph illustrating a reflectance specification of the background portion 26 according to the present embodiment.

Typical background portions reflect less invisible light. On the other hand, the typical background portions do not have a reflectance specification for visible light and may give side effects to visible images under normal operating conditions. According to the present embodiment, as illustrated in FIG. 7, the background portion 26 has a reflectance at a specific wavelength of visible light equal to or higher than a lower limit of visible light reflectance and a reflectance at a specific wavelength of invisible light equal to or lower than an upper limit of invisible light reflectance. This will be described in detail below.

FIGS. 8A and 8B are diagrams illustrating an example of the difference between read images due to the difference in the reflectance of the background portion 26.

Specifically, FIG. 8A illustrates a read image when the reflectance of the background portion 26 is high. FIG. 8B illustrates a read image when the reflectance of the background portion 26 is low.

In the present embodiment, the lower limit of visible light reflectance indicating a lower limit of the visible light reflectance is specified for the specific wavelength of visible light whereas the upper limit of invisible light reflectance indicating an upper limit of the invisible light reflectance is specified for the specific wavelength of invisible light. An image as illustrated in FIG. 8A is obtained under visible light with a high visible light reflectance and a low invisible light. By contrast, an image as illustrated in FIG. 8B is obtained under invisible light because the background is conspicuous due to a large color difference between the document 100 and the background portion 26 and the document 100 is darkened by the background when the document 100 is a white document having a high transmittance.

The visible image is often output to the user. Since a white sheet is typically used, the document and the background are often desired to look white. For this reason, the entirely dark image as illustrated in FIG. 8B is typically unpreferable. Such an entirely dark image may affect, for example, a white sheet detecting function and an automatic color selection (ACS) function.

By contrast, for the invisible image, the reflectance of the background portion may be reduced as illustrated in FIG. 8B to implement a function using the difference from the visible image.

Figures 10, 11:
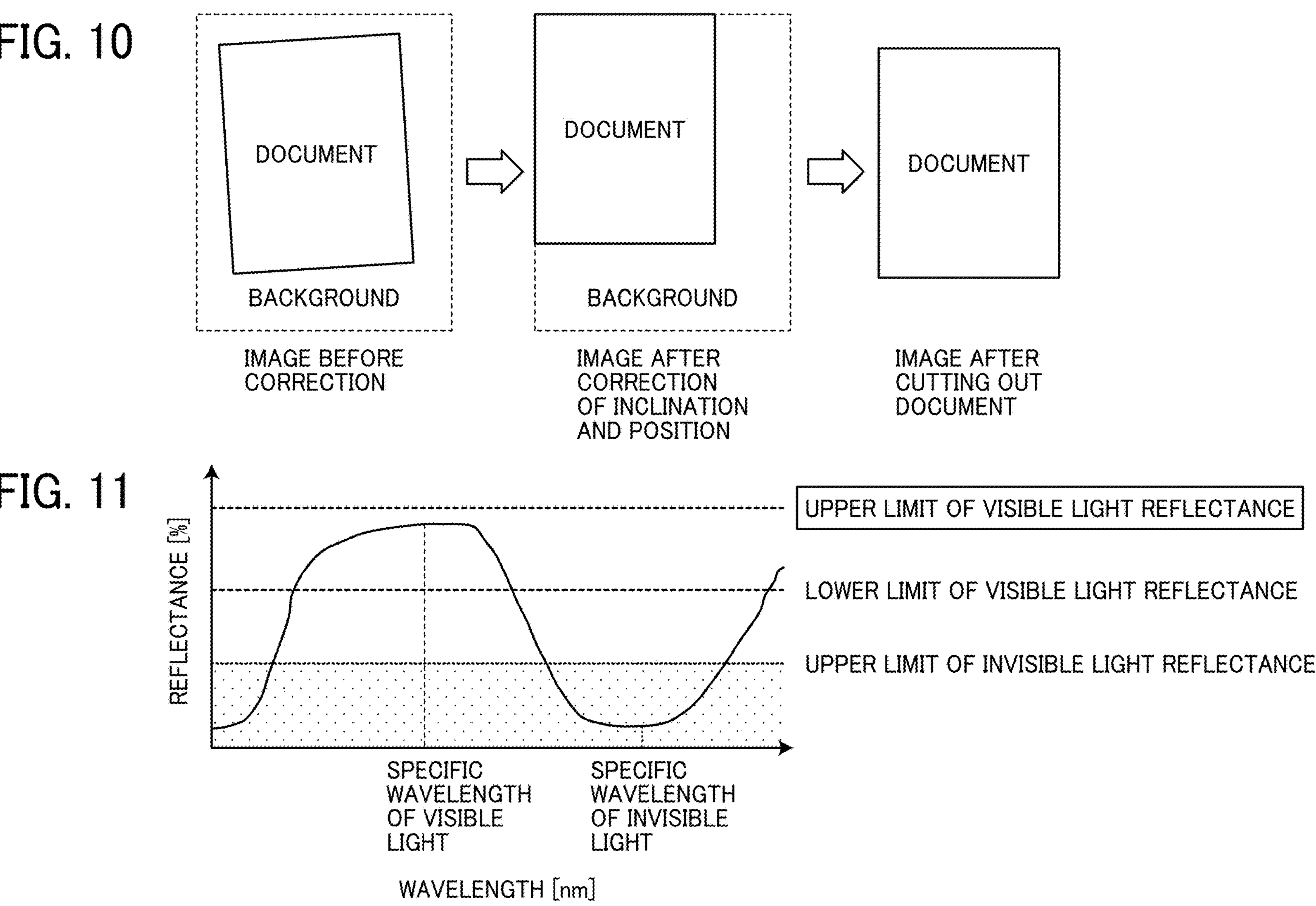
FIG. 10 is a diagram illustrating an example of correction of the inclination and position of a document.
FIG. 11 is a graph illustrating a reflectance specification of a background portion according to a second embodiment of the present disclosure.

FIG. 9 is a diagram illustrating an example of edge detection of a subject. FIG. 10 is a diagram illustrating an example of correction of the inclination and position of a document.

For example, as illustrated in FIG. 9, when an edge between the background portion 26 and the document 100 is extracted from an image, it is preferable to reduce the reflectance of the background portion 26 and use an invisible image. As illustrated in FIG. 10, when correcting the inclination and position of the document and cutting out a document image, it is preferable to reduce the reflectance of the background portion 26 and use an invisible image.

As described above, according to the present embodiment, when extracting the feature of one of the subject and the background portion from at least one of the visible image and the invisible image, the lower limit of the reflectance of the background portion at a specific wavelength of visible light and the upper limit of the reflectance of the background portion at a specific wavelength of invisible light are specified to obtain the target optical characteristics and prevent an adverse effect on the image. Specifically, since the edge between the document 100 and the background portion 26 can be detected by darkening the invisible image while maintaining the typical brightness of the visible image to some extent, the side effects on, for example, the image processing functions can be prevented.

Second Embodiment

A description is given below of a second embodiment of the present disclosure.

The second embodiment is different from the first embodiment in that an upper limit of visible light reflectance is specified for the background portion 26. Redundant descriptions of identical features in the first and second embodiments will be omitted in the following description. A description is given below of the features of the second embodiment different from the features of the first embodiment.

FIG. 11 is a graph illustrating a reflectance specification of the background portion 26 according to the second embodiment.

As illustrated in FIG. 11, according to the reflectance specification of the background portion 26 in the present embodiment, the reflectance at a specific wavelength of visible light is equal to or lower than the upper limit of visible light reflectance, in addition to that the reflectance at the specific wavelength of visible light is equal to or higher than the lower limit of visible light reflectance and the reflectance at a specific wavelength of invisible light is equal to or lower than the upper limit of invisible light reflectance. A description is given below of the reason why the upper limit of visible light reflectance is specified for the background portion 26.

When the document is fixed as in the document reading by the flatbed scanning, the visible light and the invisible light can be emitted at different times to scan the document. On the other hand, when the document moves as in the document reading by the sheet-through scanning with the ADF 20, the document fails to be scanned in the same posture unless the visible light and the invisible light are emitted at the same time to scan the document.

Figure 12:
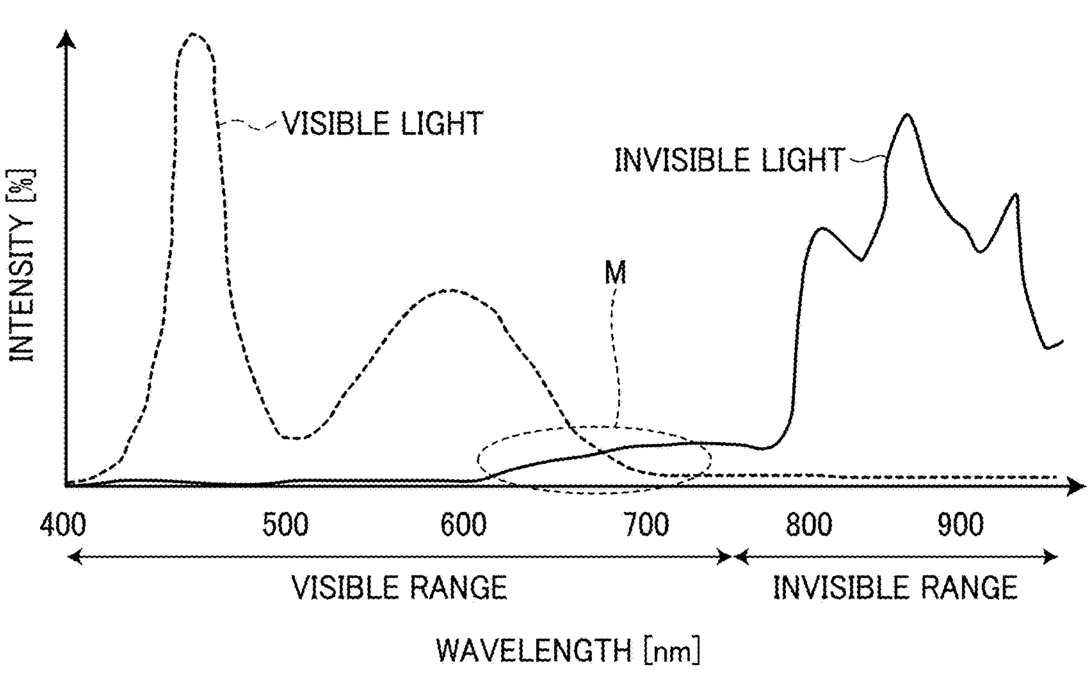
FIG. 12 is a graph illustrating an example of visible light entering an invisible light image sensor.

FIG. 12 is a graph illustrating an example of visible light entering the invisible light image sensor 40*b*.

When the document moves as in the document reading by the sheet-through scanning with the ADF 20, visible light components may be partially mixed in the invisible image as illustrated in a range M encircled by the broken line in FIG. 12. When the background portion 26 has an excessively high visible light reflectance, the invisible image having an increased amount of mixed visible light components may be close to the image illustrated in FIG. 8A than to the image illustrated in FIG. 8B.

According to the present embodiment, the upper limit of visible light reflectance of the background portion 26 is specified to reduce the amount of visible light that is mixed in the invisible image. This maintains the brightness of the invisible image at a low level.

As described above, according to the present embodiment, in a case where a certain amount of visible light is mixed in the invisible component when visible light and invisible light are simultaneously turned on to read the visible component and the invisible component to increase the reading productivity, the specified upper limit of visible light reflectance prevents the reading difference between the document 100 and the background portion 26 in the invisible image from being reduced due to an excessive visible light reflectance.

Third Embodiment

A description is given below of a third embodiment of the present disclosure.

The third embodiment is different from the first embodiment and the second embodiment in that a lower limit of invisible light reflectance is specified for the background portion 26. Redundant descriptions of identical features in the first to third embodiments will be omitted in the following description. A description is given below of the features of the third embodiment different from the features of the first and second embodiments.

Figure 13:
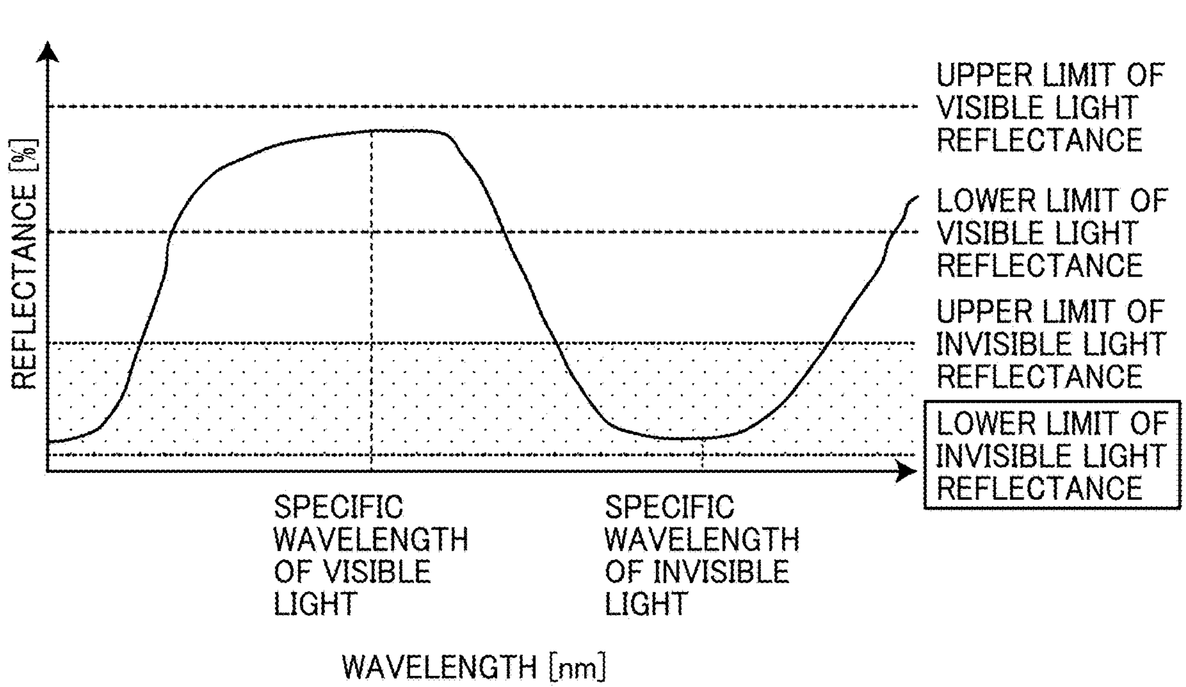
FIG. 13 is a graph illustrating a reflectance specification of a background portion according to a third embodiment of the present disclosure.

FIG. 13 is a graph illustrating a reflectance specification of the background portion 26 according to the third embodiment.

As illustrated in FIG. 13, according to the reflectance specification of the background portion 26 in the present embodiment, the reflectance at a specific wavelength of invisible light is equal to or higher than the lower limit of invisible light reflectance, in addition to that the reflectance at a specific wavelength of visible light is equal to or higher than the lower limit of visible light reflectance, the reflectance at the specific wavelength of invisible light is equal to or lower than the upper limit of invisible light reflectance, and the reflectance at the specific wavelength of visible light is equal to or lower than the upper limit of visible light reflectance. A description is given below of the reason why the lower limit of invisible light reflectance is specified for the background portion 26.

A typical image reading device reads the reference white board 12 to acquire reference data of a read value of the imager 40.

Figures 14, 15A, 15B:
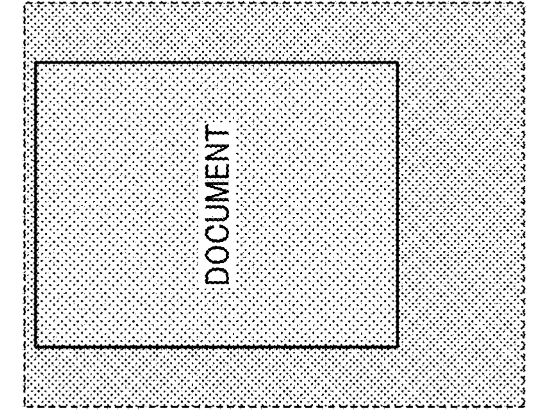
FIG. 14 is a graph illustrating an example of automatic level control (ALC)
FIGS. 15A and 15B are diagrams illustrating an example of the difference between read images due to the difference in the invisible light reflectance of a background portion.

FIG. 14 is a graph illustrating an example of automatic level control (ALC).

As illustrated in FIG. 14, the read value of the reference white board 12 may be predicted by reading the background portion 26, instead of directly reading the reference white board 12, to increase the reading productivity in the reading with the ADF 20. At this time, since an excessively small read value of the background portion 26 coarsens the resolution, the error between the actual read value of the reference white board 12 and the predicted read value of the reference white board 12 is likely to increase by the amount of the coarsened resolution.

FIGS. 15A and 15B are diagrams illustrating an example of the difference between read images due to the difference in the invisible light reflectance of the background portion 26.

Specifically, FIG. 15A illustrates a read image when the reflectance of the background portion 26 is high. FIG. 15B illustrates a read image when the reflectance of the background portion 26 is low.

When the invisible light reflectance of the background portion 26 is excessively low as illustrated in FIG. 15B, the background of the document is darkened, particularly when the document has high transparency, and characters are difficult to be recognized, as compared with FIG. 15A. In other words, the characters in the document are difficult to discriminate from the background. This is unfavorable, for example, when a character that is invisible in a visible image and reacts only to invisible light is read as an invisible image and output as a final image.

According to the present embodiment, the lower limit of invisible light reflectance of the background portion 26 is specified to reduce the reading error to enhance the image quality and the readability of characters.

As described above, according to the present embodiment, the reading error is reduced to enhance the image quality and the readability of characters.

Fourth Embodiment

A description is given below of a fourth embodiment of the present disclosure.

The fourth embodiment is different from the first to third embodiments in that the difference between the maximum reflectance value and the minimum reflectance value at a plurality of wavelengths of visible light is specified for the background portion 26 to be equal to or less than the upper limit of difference in visible light reflectance, which specifies the upper limit of the difference. Redundant descriptions of identical features in the first to fourth embodiments will be omitted in the following description. A description is given below of the features of the fourth embodiment different from the features of the first to third embodiments.

Figure 16:
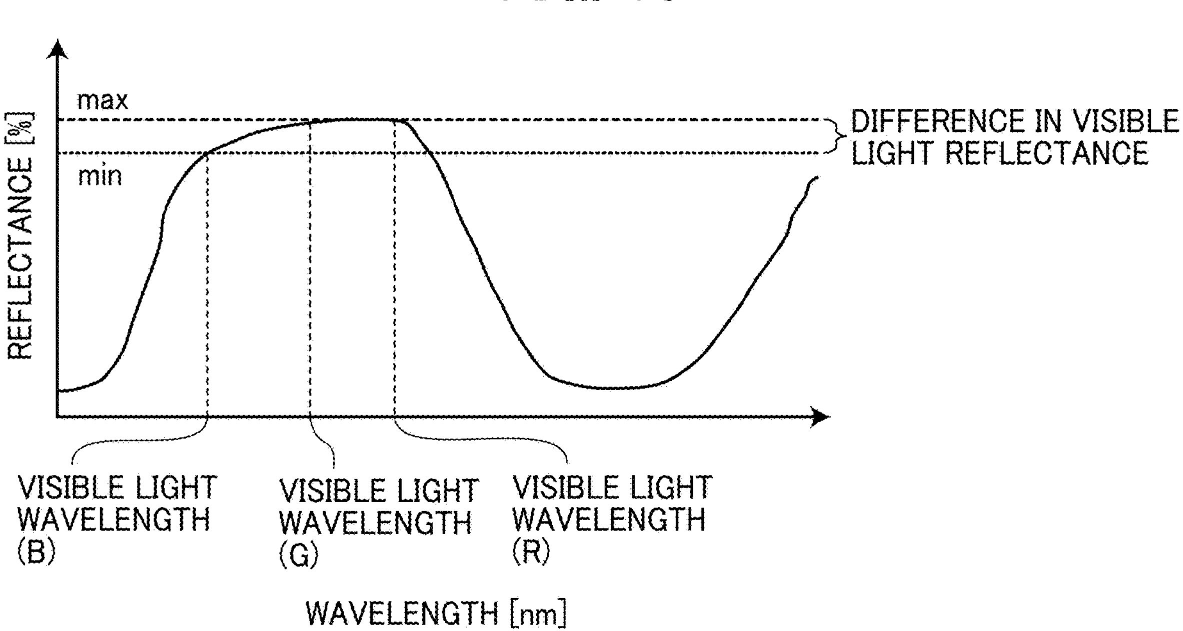
FIG. 16 is a graph illustrating a reflectance specification of a background portion according to a fourth embodiment of the present disclosure.

FIG. 16 is a graph illustrating a reflectance specification of the background portion 26 according to the fourth embodiment.

As illustrated in FIG. 16, for the background portion 26 in the present embodiment, a plurality of wavelengths are selected from the visible range (wavelengths of about 380 nm to about 750 nm) and the difference between the maximum reflectance value and the minimum reflectance value at the wavelengths of visible light is specified as the difference in visible light reflectance. The background image has a low saturation with the difference in visible light reflectance (i.e., the difference between the maximum reflectance value and the minimum reflectance value at the specific wavelengths of visible light) equal to or less than the upper limit of difference in visible light reflectance, which specifies the upper limit of the difference.

Figure 17A:
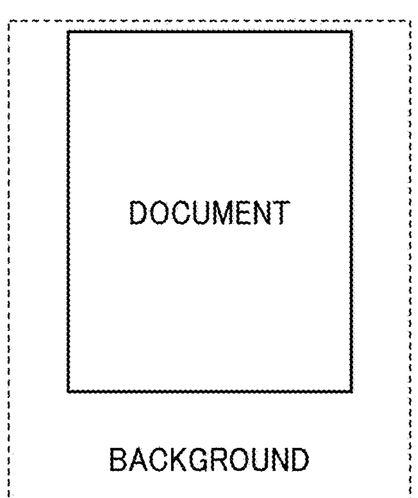
FIGS. 17A and 17B are diagrams illustrating an example of the difference between read images due to the difference in the visible light reflectance of a background portion.
Figure 17B:
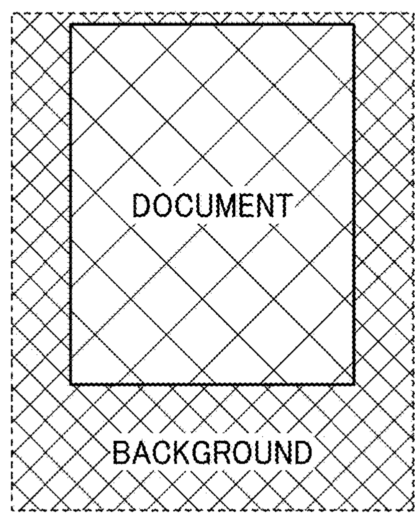

FIGS. 17A and 17B are diagrams illustrating an example of the difference between read images due to the difference in the visible light reflectance of the background portion 26.

FIG. 17A illustrates a read image when the difference in the visible light reflectance of the background portion 26 is small. FIG. 17B illustrates a read image when the difference in the visible light reflectance of the background portion 26 is large.

When the difference in the visible light reflectance of the background portion 26 is small, the color tone is less likely to appear in the background portion 26 as illustrated in FIG. 17A. By contrast, when the difference in the visible light reflectance of the background portion 26 is large, the background is conspicuous due to a large color difference between the document 100 and the background portion 26 and the background portion 26 looks yellowish as illustrated in, for example, FIG. 17B. When the document 100 is a white document having a high transmittance, the background of the document is also colored due to the influence of the background around the document.

According to the present embodiment, the upper limit of difference in the visible light reflectance of the background portion 26 is specified to prevent the coloring of the document and the background portion and not to affect, for example, the white sheet detecting function and the ACS function.

As described above, according to the present embodiment, the side effects on the color tone of the visible image can be prevented.

Fifth Embodiment

A description is given below of a fifth embodiment of the present disclosure.

The fifth embodiment is different from the first to fourth embodiments in that an upper limit of invisible light reflectance of 55% or less is specified for a wavelength of 850 nm for the background portion 26. Redundant descriptions of identical features in the first to fifth embodiments will be omitted in the following description. A description is given below of the features of the fifth embodiment different from the features of the first to fourth embodiments.

FIG. 18 is a graph illustrating a reflectance specification of the background portion 26 according to the fifth embodiment.

As illustrated in FIG. 18, in the present embodiment, the upper limit of invisible light reflectance of the background portion 26 is specified for the wavelength of 850 nm, which is a representative wavelength of near-infrared sensors, and the upper limit of invisible light reflectance is 55% or less.

The reason why the upper limit of invisible light reflectance is 55% or less is that an invisible light reflectance greater than the upper limit may cause failure to obtain an edge between the subject and the background portion 26, resulting in improper correction of the position and inclination of the subject and improper size extraction of the subject.

The upper limit of invisible light reflectance may be changed depending on the system and is specified as a value that is enough to obtain the edge between the specific document 100 and the background portion 26. The specific value depends on what kind of document is used for the specification and the image characteristics such as the signal/noise (S/N) and modulation transfer function (MTF) of an acquired image. The document may be specified based on the basis weight, ream weight, and International Organization for Standardization (ISO) opacity of the assumed document.

As described above, according to the present embodiment, the edge between the document 100 and the background portion 26 is detected to correct the position and inclination of the document and the size extraction of the document.

Sixth Embodiment

A description is given below of a sixth embodiment of the present disclosure.

The sixth embodiment is different from the first to fifth embodiments in that a lower limit of visible light reflectance of 55% or more is specified for a wavelength of 550 nm for the background portion 26. Redundant descriptions of identical features in the first to sixth embodiments will be omitted in the following description. A description is given below of the features of the sixth embodiment different from the features of the first to fifth embodiments.

FIG. 19 is a graph illustrating a reflectance specification of the background portion 26 according to the sixth embodiment.

As illustrated in FIG. 19, in the present embodiment, the lower limit of visible light reflectance of the background portion 26 is specified for the wavelength of 550 nm, which is a representative wavelength of the sensors of the visible range green (G) component, and the lower limit of visible light reflectance is 55% or more.

The reason why the lower limit of visible light reflectance is 55% or more is that a visible light reflectance less than the lower limit may hamper the proper working of the image processing functions such as the white sheet detecting function and the ACS function, resulting in, for example, the erroneous detection of a white document as not being a white sheet.

The lower limit of visible light reflectance may be changed depending on the system and is specified as a value that causes the image processing functions such as the white sheet detecting function and the ACS function to properly work for a specific document. The specific value depends on what kind of document is used for the specification, the image characteristics such as the S/N and MTF of an acquired image, and a threshold for determining the image processing function. The document may be specified based on the basis weight, ream weight, and ISO opacity of the assumed document.

As described above, according to the present embodiment, the document and background stains of the visible image and the side effects on, for example, the white sheet detecting function and the ACS function are prevented.

Seventh Embodiment

A description is given below of a seventh embodiment of the present disclosure.

The seventh embodiment is different from the first to sixth embodiments in that an upper limit of visible light reflectance of 99% or less is specified for a wavelength of 550 nm for the background portion 26. Redundant descriptions of identical features in the first to seventh embodiments will be omitted in the following description. A description is given below of the features of the seventh embodiment different from the features of the first to sixth embodiments.

FIG. 20 is a graph illustrating a reflectance specification of the background portion 26 according to the seventh embodiment.

As illustrated in FIG. 20, in the present embodiment, the upper limit of visible light reflectance of the background portion 26 is specified for the wavelength of 550 nm, which is a representative wavelength of the sensors of the visible range G component, and the upper limit of reflectance of visible light is 99% or less.

The reason why the upper limit of reflectance of visible light is 99% or more is that the visible light reflectance greater than the upper limit may cause failure to obtain an edge between the subject and the background portion 26 when the visible light and the invisible light are emitted at the same time for sensing, resulting in improper correction of the position and inclination of the subject and improper size extraction of the subject.

The upper limit of visible light reflectance may be changed depending on the system and is specified as a value that is enough to obtain the edge between the specific document 100 and the background portion 26 when the visible light and the invisible light are emitted at the same time for sensing. The specific value depends on what kind of document is used for the specification, the amount of visible light entering the invisible light image sensor 40*b*, and the image characteristics such as the S/N and MTF of an acquired image.

The document may be specified based on the basis weight, ream weight, and ISO opacity of the assumed document.

As described above, according to the present embodiment, the edge between the document 100 and the background portion 26 is detected to correct the position and inclination of the document and the size extraction of the document.

Eighth Embodiment

A description is given below of an eighth embodiment of the present disclosure.

The eighth embodiment is different from the first to seventh embodiments in that a lower limit of invisible light reflectance of 1% or more is specified for a wavelength of 850 nm for the background portion 26. Redundant descriptions of identical features in the first to eighth embodiments will be omitted in the following description. A description is given below of the features of the eighth embodiment different from the features of the first to seventh embodiments.

Figure 21:
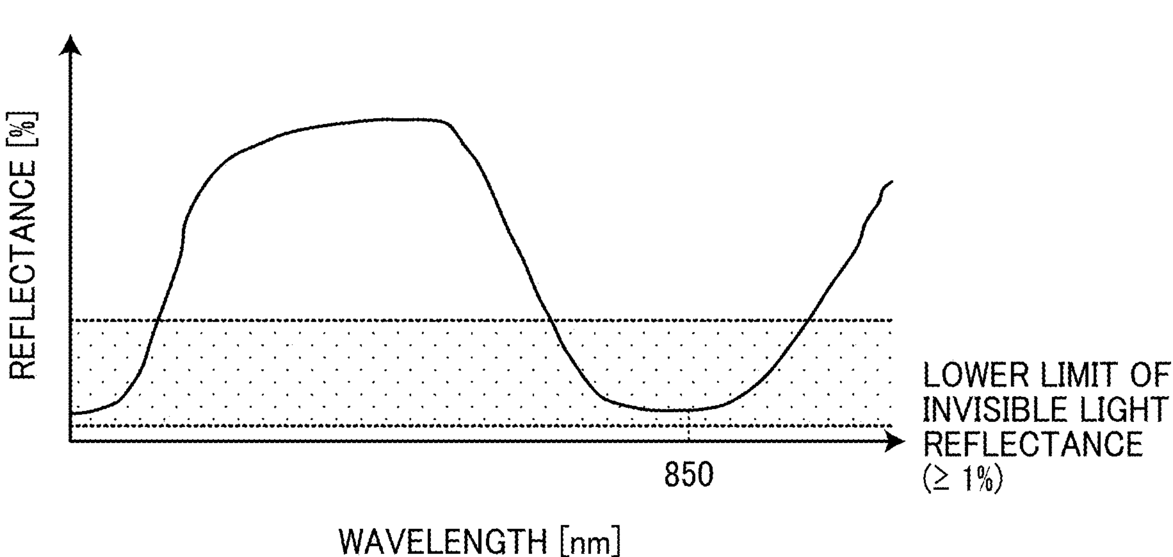
FIG. 21 is a graph illustrating a reflectance specification of a background portion according to an eighth embodiment of the present disclosure.

FIG. 21 is a graph illustrating a reflectance specification of the background portion 26 according to the eighth embodiment.

As illustrated in FIG. 21, in the present embodiment, the lower limit of invisible light reflectance of the background portion 26 is specified for the wavelength of 850 nm, which is a representative wavelength of near-infrared sensors, and the lower limit of invisible light reflectance is 1% or more.

The reason why the lower limit of invisible light reflectance is 1% or more is that an invisible light reflectance less than the lower limit may increase the error between the actual read value of the reference white board 12 and the predicted read value of the reference white board 12 in the ADF 20, resulting in an abnormal brightness of an outputted image or failure to read the characters in the document of the invisible image.

The lower limit of invisible light reflectance may be changed depending on the system and is specified as a value that is enough to reduce the error between the actual read value of the reference white board 12 and the predicted read value of the reference white board 12 and identify the characters in the document of the invisible image. The specific value depends on the allowable value of the error between the actual read value of the reference white board 12 and the predicted read value of the reference white board 12 and what kind of document (character) is used for the specification. The document may be specified based on the basis weight, ream weight, ISO opacity, and font and size of characters of the assumed document.

As described above, according to the present embodiment, the side effects on the ALC can be prevented. Further, according to the present embodiment, when an invisible image is output, the background and the character can be discriminated and the function using the discrimination between the background and the character can be prevented from being affected.

Ninth Embodiment

A description is given below of a ninth embodiment of the present disclosure.

The ninth embodiment is different from the first to eighth embodiments in that an upper limit of difference in visible light reflectance of 44% or less is specified for wavelengths of 450 nm, 550 nm, and 600 nm for the background portion 26. Redundant descriptions of identical features in the first to ninth embodiments will be omitted in the following description. A description is given below of the features of the ninth embodiment different from the features of the first to eighth embodiments.

Figure 22:
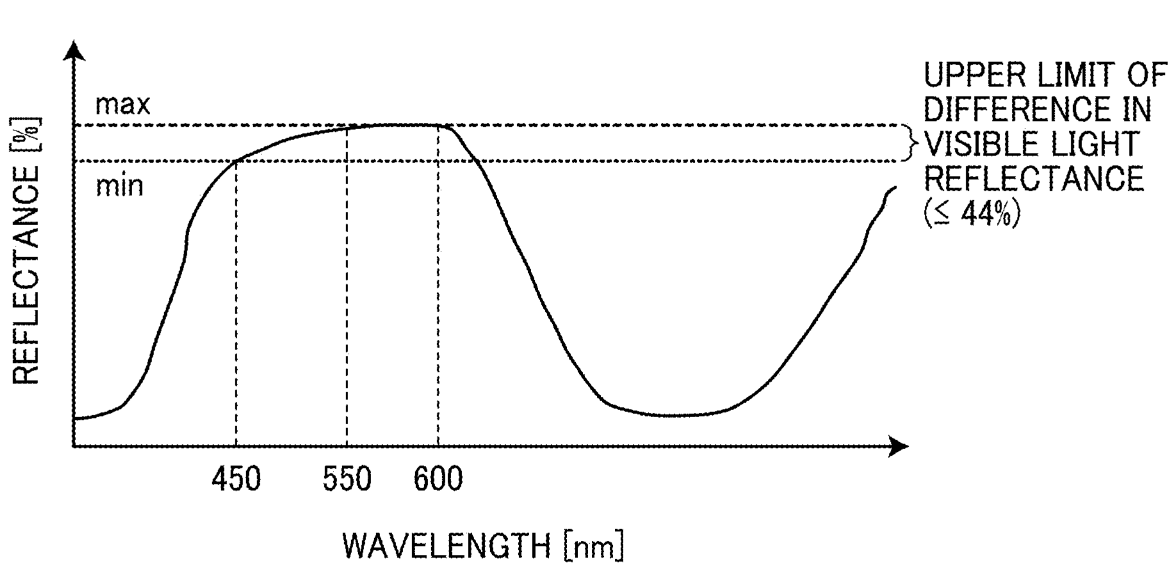
FIG. 22 is a graph illustrating a reflectance specification of a background portion according to a ninth embodiment of the present disclosure.

FIG. 22 is a graph illustrating a reflectance specification of the background portion 26 according to the ninth embodiment.

As illustrated in FIG. 22, in the present embodiment, the upper limit of difference in the visible light reflectance of the background portion 26 is specified for the wavelengths of 450 nm, 550 nm, and 600 nm, which are representative wavelengths of the sensors of the visible range red-green-blue (RGB) components, and the upper limit of difference in visible light reflectance is 44% or less. This range is determined based on the difference between the aforementioned upper limit of visible light reflectance (99% or less) and the lower limit of visible light reflectance (55% or more).

The reason why the upper limit of difference in visible light reflectance is 44% or less is that a difference in visible light reflectance greater than the upper limit may hamper the proper working of the image processing functions such as the white sheet detecting function and the ACS function, resulting in, for example, the erroneous detection of a monochrome document image as a color image.

The upper limit of difference in visible light reflectance may be changed depending on the system and is specified as a value that causes the image processing functions such as the white sheet detecting function and the ACS function to properly work for a specific document. The specific value depends on what kind of document is used for the specification, the image characteristics such as the S/N and MTF of an acquired image, and a threshold for determining the image processing function. The document may be specified based on the basis weight, ream weight, and ISO opacity of the assumed document.

As described above, according to the present embodiment, the document and background stains of the visible image and the side effects on, for example, the white sheet detecting function and the ACS function are prevented.

The image reading device according to the above embodiments of the present disclosure has been described as being applied to an MFP having at least two of copying, printing, scanning, and facsimile functions. Alternatively, the image reading device may be applied to, for example, a copier, a printer, a scanner, or a facsimile machine.

Figure 23A:
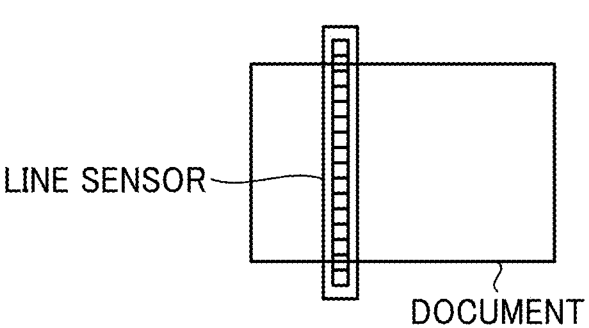
FIGS. 23A to 23C are diagrams each illustrating a modified image reading device.

Although the image reading device 1 is applied as the image reading device in the above embodiments, the image reading device is not limited to the image reading device 1. The image reading device may be defined as a device that can acquire a reading level without reading a subject as an image, such as a line sensor employing an equal magnification optical system (contact optical system: contact image sensor (CIS) system) illustrated in FIG. 23A. FIG. 23A illustrates a line sensor as an example of such image reading devices. In this case, the line sensor or a document is moved to read information of a plurality of lines.

Figure 23B:
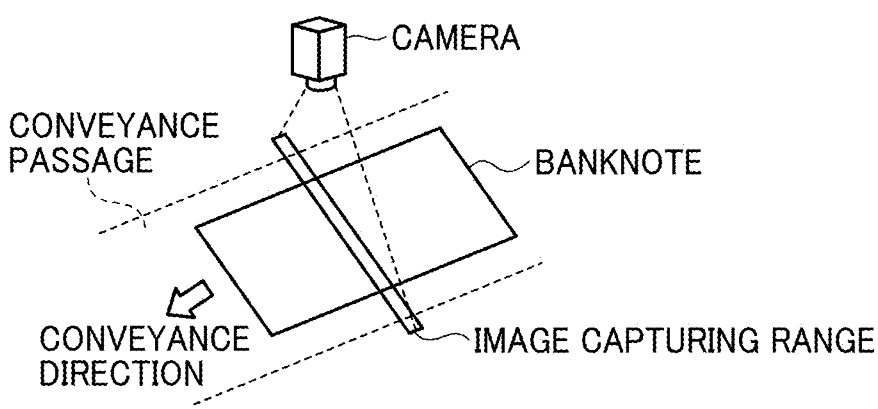
Figure 23C:
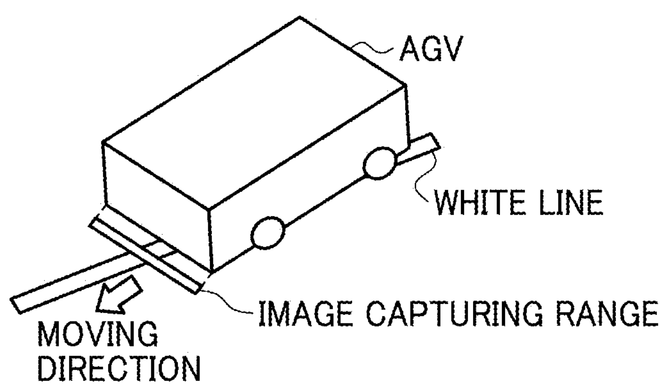

Alternatively, the image reading device can be applied to, for example, a banknote conveying device illustrated in FIG. 23B or a white line detector of an automated guided vehicle (AGV) illustrated in FIG. 23C.

The subject of the banknote conveying device illustrated in FIG. 23B is a banknote. The feature detected by the banknote conveying device is used for, for example, the correction of images. In other words, the banknote conveying device illustrated in FIG. 23B recognizes the inclination of the banknote by edge detection and performs skew correction based on the recognized inclination.

The subject of the white line detector of the AGV illustrated in FIG. 23C is a white line. The feature output by the white line detector of the AGV can be used for, example, the determination of a moving direction of the AGV. In other words, the white line detector of the AGV recognizes the inclination of a white-line area by edge detection and determines the moving direction of the AGV based on the recognized inclination. The white line detector of the AGV can correct the moving direction according to the position and orientation of the AGV in a later process. For example, the AGV including the white line detector can execute processing such as stopping driving when detecting a thickness different from the known thickness of the white line.

A description is now given below of several aspects of the present disclosure.

According to a first aspect, an image reading device includes an illuminator, an imager, a background portion, and an image processor. The illuminator irradiates a subject with visible light and invisible light. The imager receives the visible light and the invisible light reflected by the subject to capture a visible image and an invisible image. The background portion is disposed in an image capturing range of the imager. The image processor detects a feature of one of the subject and the background portion from at least one of the visible image and the invisible image. The background portion has a reflectance at a specific wavelength of the visible light equal to or higher than a lower limit of visible light reflectance, which specifies a lower limit of reflectance of the visible light, and a reflectance at a specific wavelength of the invisible light equal to or lower than an upper limit of invisible light reflectance, which specifies an upper limit of reflectance of the invisible light.

According to a second aspect, in the image reading device of the first aspect, the reflectance of the background portion at the specific wavelength of the visible light is equal to or lower than an upper limit of visible light reflectance, which specifies an upper limit of reflectance of the visible light.

According to a third aspect, in the image reading device of the first or second aspect, the reflectance of the background portion at the specific wavelength of the invisible light is equal to or higher than a lower limit of invisible light reflectance, which specifies a lower limit of reflectance of the invisible light.

According to a fourth aspect, in the image reading device of any one of the first to third aspects, the background portion has a difference between a maximum reflectance value and a minimum reflectance value at specific wavelengths of the visible light equal to or less than an upper limit of difference in visible light reflectance, which specifies an upper limit of the difference.

According to a fifth aspect, in the image reading device of any one of the first to fourth aspects, the illuminator emits infrared light as the invisible light, and the imager captures an infrared image as the invisible image.

According to a sixth aspect, in the image reading device of any one of the first to fourth aspects, the image processor detects an edge between the subject and the background portion as the feature of the at least one of the visible image and the invisible image, and the upper limit of invisible light reflectance of the background portion is equal to or lower than 55% when the specific wavelength is 850 nm.

According to a seventh aspect, in the image reading device of any one of the first to sixth aspects, the image processor detects brightness of the subject as the feature of the visible image, and the lower limit of visible light reflectance of the background portion is equal to or higher than 55% when the specific wavelength is 550 nm.

According to an eighth aspect, in the image reading device of any one of the second to seventh aspects, the image processor detects an edge between the subject and the background portion as the feature of the at least one of the visible image and the invisible image, and the upper limit of visible light reflectance of the background portion is equal to or lower than 99% when the specific wavelength is 550 nm.

According to a ninth aspect, in the image reading device of the third aspect, the image processor detects brightness of the background portion as the feature of the invisible image, and the lower limit of invisible light reflectance of the background portion is equal to or higher than 1% when the specific wavelength is 850 nm.

According to a tenth aspect, in the image reading device of the fourth aspect, the image processor detects saturation of the subject as the feature of the visible image, and the upper limit of difference in visible light reflectance of the background portion is equal to or lower than 44% when the specific wavelengths are 450 nm, 550 nm, and 600 nm.

According to an eleventh aspect, an image reading method executed by an image reading device includes irradiating, receiving, and detecting. The irradiating is irradiating, with an illuminator, a subject with visible light and invisible light. The receiving is receiving, with an imager, the visible light and the invisible light reflected by the subject to capture a visible image and an invisible image. The detecting is detecting, with an image processor, a feature of one of the subject and a background portion disposed in an image capturing range of the imager from at least one of the visible image and the invisible image. The background portion has a reflectance at a specific wavelength of the visible light equal to or higher than a lower limit of visible light reflectance, the lower limit of visible light reflectance specifying a lower limit of reflectance of the visible light, and a reflectance at a specific wavelength of the invisible light equal to or lower than an upper limit of invisible light reflectance, the upper limit of invisible light reflectance specifying an upper limit of reflectance of the invisible light.

According to one or more aspects of the present disclosure, an adverse effect on an image can be prevented when extracting a feature of one of a subject and a background portion from at least one of a visible image and an invisible image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), field programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. An image reading device comprising:

an illuminator to irradiate a subject with visible light and invisible light;

an imager to receive the visible light and the invisible light reflected by the subject to capture a visible image and an invisible image;

a background portion in an image capturing range of the imager, the background portion having:

a reflectance at a specific wavelength of the visible light equal to or higher than a lower limit of visible light reflectance, the lower limit of visible light reflectance specifying a lower limit of reflectance of the visible light; and a reflectance at a specific wavelength of the invisible light equal to or lower than an upper limit of invisible light reflectance, the upper limit of invisible light reflectance specifying an upper limit of reflectance of the invisible light; and an image processor configured to detect a feature of one of the subject and the background portion from at least one of the visible image and the invisible image, wherein:

the background portion has a difference between a maximum reflectance value and a minimum reflectance value at a plurality of specific wavelengths of the visible light equal to or less than an upper limit of difference in visible light reflectance, the upper limit of difference in visible light reflectance specifying an upper limit of the difference, the image processor is configured to detect saturation of the subject as the feature of the visible image, and the upper limit of difference in visible light reflectance of the background portion is equal to or lower than 44% when the plurality of specific wavelengths are 450 nm, 550 nm, and 600 nm.

2. The image reading device according to claim 1, wherein:

the reflectance of the background portion at the specific wavelength of the visible light is equal to or lower than an upper limit of visible light reflectance, the upper limit of visible light reflectance specifying an upper limit of reflectance of the visible light.

3. The image reading device according to claim 1, wherein:

the reflectance of the background portion at the specific wavelength of the invisible light is equal to or higher than a lower limit of invisible light reflectance, the lower limit of invisible light reflectance specifying a lower limit of reflectance of the invisible light.

4. The image reading device according to claim 1, wherein:

the illuminator emits infrared light as the invisible light, and the imager captures an infrared image as the invisible image.

5. The image reading device according to claim 1, wherein:

the image processor is configured to detect an edge between the subject and the background portion as the feature of the at least one of the visible image and the invisible image, and the upper limit of invisible light reflectance of the background portion is equal to or lower than 55% when the specific wavelength of the invisible light is 850 nm.

6. The image reading device according to claim 1, wherein:

the image processor is configured to detect brightness of the subject as the feature of the visible image, and the lower limit of visible light reflectance of the background portion is equal to or higher than 55% when the specific wavelength of the visible light is 550 nm.

7. The image reading device according to claim 2, wherein:

the image processor is configured to detect an edge between the subject and the background portion as the feature of the at least one of the visible image and the invisible image, and the upper limit of visible light reflectance of the background portion is equal to or lower than 99% when the specific wavelength of the visible light is 550 nm.

8. The image reading device according to claim 3, wherein:

the image processor is configured to detect brightness of the background portion as the feature of the invisible image, and the lower limit of invisible light reflectance of the background portion is equal to or higher than 1% when the specific wavelength of the invisible light is 850 nm.

9. The image reading device according to claim 1, wherein:

the background portion is a structure facing a slit-shaped reading window which is a part of a platen.

10. The image reading device according to claim 1, wherein the imager includes:

an integral light sensor including a visible light image sensor and an invisible light image sensor.

11. The image reading device according to claim 1, further comprising:

an automatic document feeder to convey the subject over a reading window, wherein the background portion is disposed in the automatic document feeder to face the reading window.

12. The image reading device according to claim 1, wherein:

the image processor is further configured to correct an inclination and a position of the subject based on the feature detected from the at least one of the visible image and the invisible image.

13. The image reading device according to claim 1, wherein:

the image processor is further configured to cut out an image of the subject based on the feature detected from the at least one of the visible image and the invisible image.

14. The image reading device according to claim 1, wherein:

the illuminator includes a visible light source and an invisible light source that simultaneously turn on to scan the subject as the subject moves.

15. The image reading device according to claim 1, wherein:

the imager is a line sensor to read information of a plurality of lines by relative movement between the line sensor and the subject.

16. An image reading method, comprising:

irradiating a subject with visible light and invisible light;

receiving the visible light and the invisible light reflected by the subject to capture a visible image and an invisible image; and detecting a feature of one of the subject and a background portion from at least one of the visible image and the invisible image, the background portion being disposed in an image capturing range and having:

a reflectance at a specific wavelength of the visible light equal to or higher than a lower limit of visible light reflectance, the lower limit of visible light reflectance specifying a lower limit of reflectance of the visible light; and a reflectance at a specific wavelength of the invisible light equal to or lower than an upper limit of invisible light reflectance, the upper limit of invisible light reflectance specifying an upper limit of reflectance of the invisible light, wherein:

the background portion has a difference between a maximum reflectance value and a minimum reflectance value at a plurality of specific wavelengths of the visible light equal to or less than an upper limit of difference in visible light reflectance, the upper limit of difference in visible light reflectance specifying an upper limit of the difference, and the detecting detects saturation of the subject as the feature of the visible image, and the upper limit of difference in visible light reflectance of the background portion is equal to or lower than 44% when the plurality of specific wavelengths are 450 nm, 550 nm, and 600 nm.

17. The image reading method according to claim 16, wherein:

the reflectance of the background portion at the specific wavelength of the visible light is equal to or lower than an upper limit of visible light reflectance, the upper limit of visible light reflectance specifying an upper limit of reflectance of the visible light.

18. The image reading method according to claim 16, wherein:

the reflectance of the background portion at the specific wavelength of the invisible light is equal to or higher than a lower limit of invisible light reflectance, the lower limit of invisible light reflectance specifying a lower limit of reflectance of the invisible light.

19. The image reading method according to claim 16, further comprising:

conveying the subject with an automatic document feeder over a reading window, wherein the background portion is disposed to face the reading window.

20. The image reading method according to claim 16, further comprising:

predicting a read value of a reference white board by reading the background portion instead of directly reading the reference white board.

* * * * *